United States Patent [19]
Fujita

[11] Patent Number: 5,166,820
[45] Date of Patent: Nov. 24, 1992

[54] LIGHT BEAM SCANNING APPARATUS

[75] Inventor: Hiroo Fujita, Sayama, Japan

[73] Assignee: Citizen Watch Co., Ltd., Japan

[21] Appl. No.: 668,824

[22] Filed: Mar. 13, 1991

[30] Foreign Application Priority Data

| Mar. 13, 1990 | [JP] | Japan | 2-60096 |
| Nov. 20, 1990 | [JP] | Japan | 2-315146 |
| Nov. 30, 1990 | [JP] | Japan | 2-329960 |

[51] Int. Cl.⁵ .................................................. G02B 26/10
[52] U.S. Cl. .................................... 359/211; 359/202; 359/834; 235/467
[58] Field of Search ............... 359/202, 209, 211, 831, 359/832, 833, 834, 201; 250/235, 236; 235/462, 467

[56] References Cited

U.S. PATENT DOCUMENTS

| 2,406,798 | 9/1946  | Burroughs    | 359/211 |
| 3,511,551 | 5/1970  | Matulka      | 359/202 |
| 3,614,212 | 10/1971 | Hock         | 359/211 |
| 3,762,793 | 10/1973 | Ullstig      | 359/202 |
| 4,209,224 | 6/1980  | Stewart, Jr. | 359/211 |
| 4,773,754 | 9/1988  | Eisele       | 359/211 |
| 4,948,228 | 8/1990  | Keens        | 359/834 |

Primary Examiner—Loha Ben
Attorney, Agent, or Firm—Finnegan, Henderson, Farabow, Garrett & Dunner

[57] ABSTRACT

A light beam scanner comprises a light beam generating unit for generating a light beam, a first scanning unit for guiding the light beam in a first scanning direction, a second scanning unit composed of a deflection prism for guiding the light beam in a second scanning direction that is different from the first scanning direction, and an object lens. The second scanning unit is movable in an optical direction in parallel with an optical axis or turnable around the optical axis, so that the light beam entering the second scanning unit may be deflected in any direction when exiting from the second scanning unit.

18 Claims, 14 Drawing Sheets

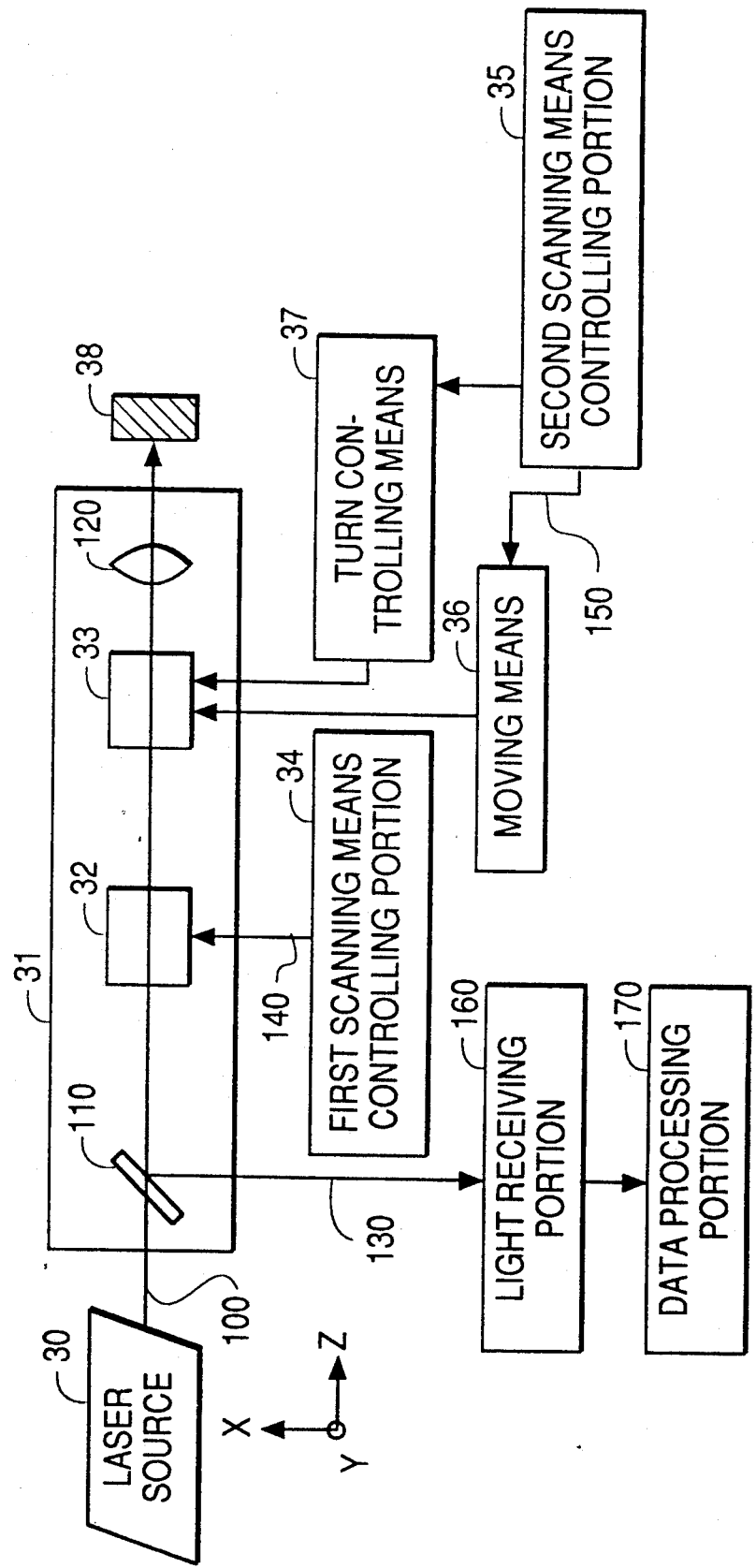

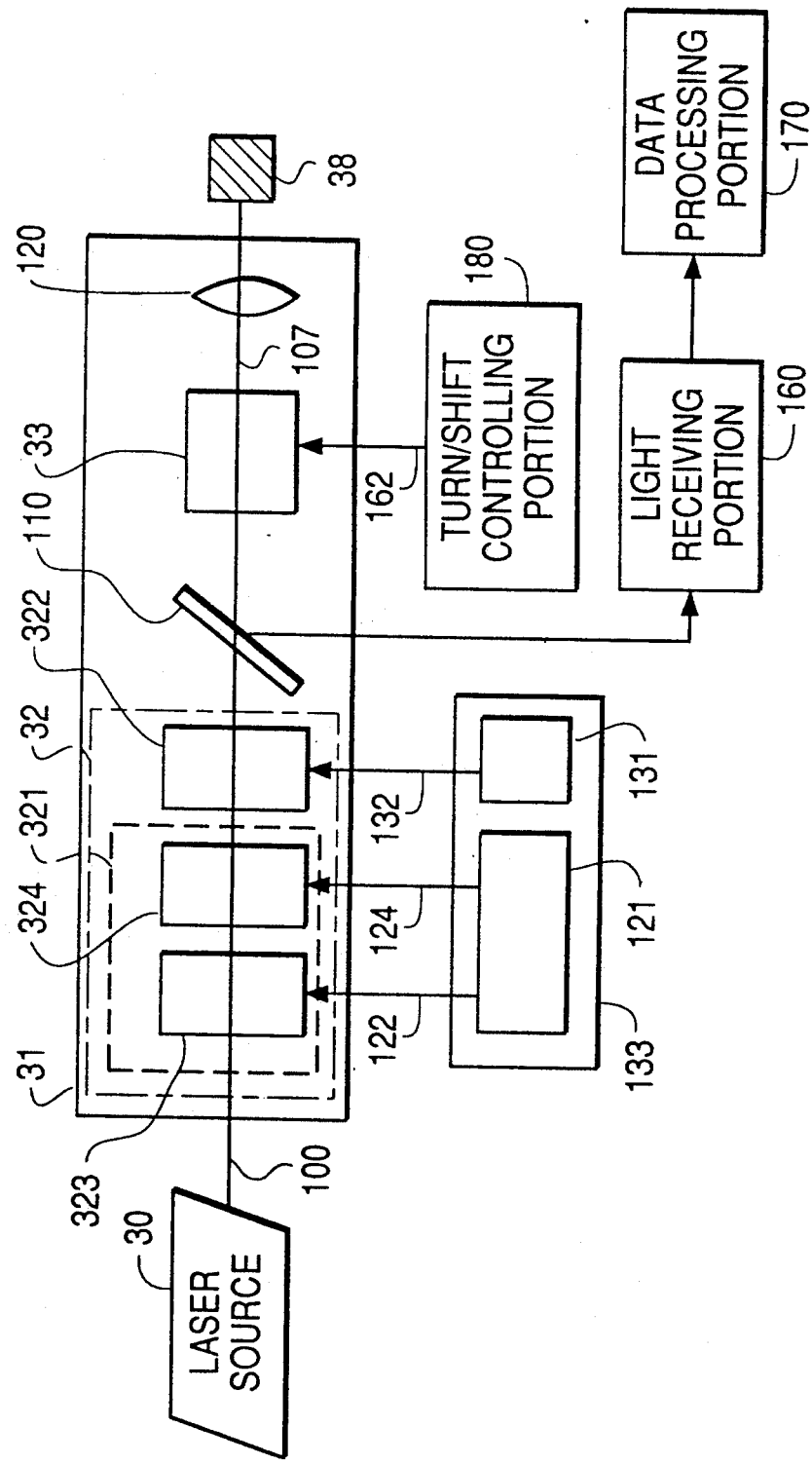

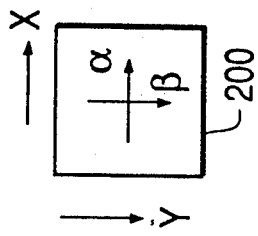

LIGHT BEAM SCANNING APPARATUS

BACKGROUND OF THE INVENTION

1. Field of the Invention

The present invention relates to a light beam scanner for scanning an object to precisely measure the shape and size of the object, and particularly to a light beam scanner which converges a laser beam into a fine beam spot to scan a two-dimensional plane with the beam spot in an optional direction and measure a fine two-dimensional pattern on the plane.

2. Description of the Related Art

Precision processing technology has improved dramatically in recent years, and in semiconductor and precision machinery industries, is being employed to form two-dimensional fine patterns of the order of micrometers. This results in a need for precise measurement of the size and shape of a fine pattern, and the precise measurement requires high spatial resolution. To improve the spatial resolution, a light beam or laser beam scanner is needed which can converge a laser beam into a fine spot and scan a given range of an object at a fine scanning step of, for example, 0.01 micrometer.

In some cases, the light beam scanner must two-dimensionally scan an area of several tens or several hundreds of square micrometers at a scanning step of, for example, 0.05 micrometer.

The scanner comprises a scanning element for scanning an object with a light beam. The scanning element is usually an acousto-optic deflection element, a galvanomirror, or a polygon mirror. In linearly scanning the object with a light beam, the scanning element is combined with various lenses to form a scanner. In two-dimensionally scanning the object with a light beam, two scanning elements are combined with various lenses to form a scanner. The scanning direction of each of the scanning elements is, for example, the direction of an axis X or Y depending on the optical system of the element.

A conventional two-dimensional scanner for measuring a two-dimensional pattern usually carries out raster scanning on a plane defined by orthogonal axes X and Y.

A linear or a two-dimensional light beam scanner predetermines its scanning direction in the direction of an X or Y axis, or both, and carries out raster scanning in the orthogonal directions. A pattern on a two-dimensional object is not always in parallel with the axes X and Y but may extend in optional directions. The conventional raster scanner cannot measure such a pattern extending in optional directions.

To direct a light beam in an optional direction other than the X-axis or Y-axis direction, it is necessary to modulate driving signals for driving X-axis and Y-axis scanning elements to simultaneously scan the X and Y axes, thereby changing a scanning direction. Alternatively, third and fourth scanning elements must be added to freely change the scanning direction. Modulating the driving signals requires, however, a complicated driving circuit, and adding other scanning elements complicates the scanner optical system. Due to these problems, it is difficult to scan an object in an optional direction. In addition, a range to be scanned must have uniform scan characteristics.

A conventional bar code reader will now be explained. To read information from a bar code, it is necessary to surely scan a bar code label with a laser beam. In the field of physical distribution, the orientation and position of a bar code label attached to an article vary widely. This results in a need for a multidirectional scanner that can stably scan a bar code label with a laser beam irrespective of the orientation and position of the bar code label. A simple bar code scanner frequently used is a linear scanner comprising a scanning element such as a polygon mirror or a galvanomirror which scans only a line with a laser beam. In this case, the bar code label must be positioned at the laser beam scanning position to read information from the label.

To multidirectionally scan the bar code label, it is necessary to two-dimensionally direct a laser beam. FIG. 1(A) shows a simplest form of a two-dimensional bar code scanner.

In FIG. 1(A), a laser source 11 emits a laser beam, which is separated in two directions by a half mirror 12. One of the separated beams, i.e., a beam 230 passed through the half mirror 12 is reflected by a reflector 13 to irradiate a polygon mirror 14. The other of the separated beams, i.e., a beam 235 reflected by the half mirror 12 directly irradiates the polygon mirror 14. The polygon mirror 14 changes the direction of a reflected beam depending on its rotational state. The beam 230 is reflected by the polygon mirror 14 as a reflected beam 240, which is reflected by a reflector 15 to scan an object in a direction X.

On the other hand, the beam 235 is reflected by the polygon mirror 14 as a reflected beam 245, which advances differently from the reflected beam 240. The reflected beam 245 is reflected by a reflector 16 to scan the object in a direction Y. In this way, the object is scanned in the crossing directions with the reflected beams.

According to the method of FIG. 1(A), the reflectors 15 and 16 are inclined in synchronism with the rotation of the polygon mirror 14 to realize two-dimensional crosshatch scanning as shown in FIG. 1(B). This method is applicable when the attaching position of a bar code label varies in the orthogonal two directions.

In FIG. 1(A), various lenses for converging laser beams are omitted.

FIG. 2(A) shows another example of the conventional multidirectional scanner. A laser source 20 emits a laser beam, which is reflected by a reflector 21 to irradiate a rectangular prism 22. The rectangular prism 22 is turned by a motor 23. According to the turning of the rectangular prism 22, the direction of a reflected beam changes. There are "n" reflectors 24a to 24n disposed concentrically around the rectangular prism 22. In response to the turning of the rectangular prism 22, the reflected beam successively irradiates the reflectors 24a to 24n, which provide radial scanning beams as shown in FIG. 2(B). The number of the radial scanning beams is determined by the number of the reflectors disposed around the rectangular prism 22. In FIG. 2(A), various lenses for converging laser beams are omitted.

According to the conventional bar code scanners shown in FIGS. 1(A) and 2(A), the multidirectional scan is realized by reflecting a laser beam in different directions and converting the reflected beams into two-dimensional scan patterns by the use of many reflectors. In these scanners, the number of scanning lines is determined by the number of the reflectors so that, to increase the number of the scanning lines, the number of the reflectors must be increased. This may enlarge the size of the optical system of the scanner and complicate the adjustment of the optical system.

SUMMARY OF THE INVENTION

An object of the invention is to solve the above problems and provide a light beam scanner involving a simple optical system and a driving signal which can direct a light beam in an optional direction.

To achieve the object, a light beam scanner of the invention basically comprises a light beam generating means, a first scanning means for directing a light beam in a first direction, a second scanning means composed of a deflection prism for directing the light beam in a direction that is different from the first direction, and an object lens means. These means are arranged on a common optical axis.

According to a first aspect of the invention, the second scanning means can move in parallel with the optical axis.

According to a second aspect of the invention, the second scanning means can turn around the optical axis.

According to a third aspect of the invention, the second scanning means can move in parallel with and turn around the optical axis.

The deflection prism of the second scanning means has an incident surface and outgoing surface that are orthogonal to the optical axis. Between the incident and outgoing surfaces, there are at least three reflection points for reflecting the light beam. The deflection prism is so constituted that an incident optical axis and outgoing optical axis of the light beam with respect to the defection prism are in parallel with each other. In particular, the deflection prism is so constituted that the outgoing position or scanning direction of an outgoing light beams changes two times the incident position or scanning direction of an incident light beam.

BRIEF DESCRIPTION OF THE DRAWINGS

FIG. 3 is a block diagram showing a first embodiment of the invention;

FIG. 10 is a block diagram explaining the arrangement and operation of the third embodiment of the invention;

FIGS. 12(A) and 12(B) are views explaining changes of scanning direction caused by turning the deflection prism;

DESCRIPTION OF THE PREFERRED EMBODIMENTS

Figure 1A:
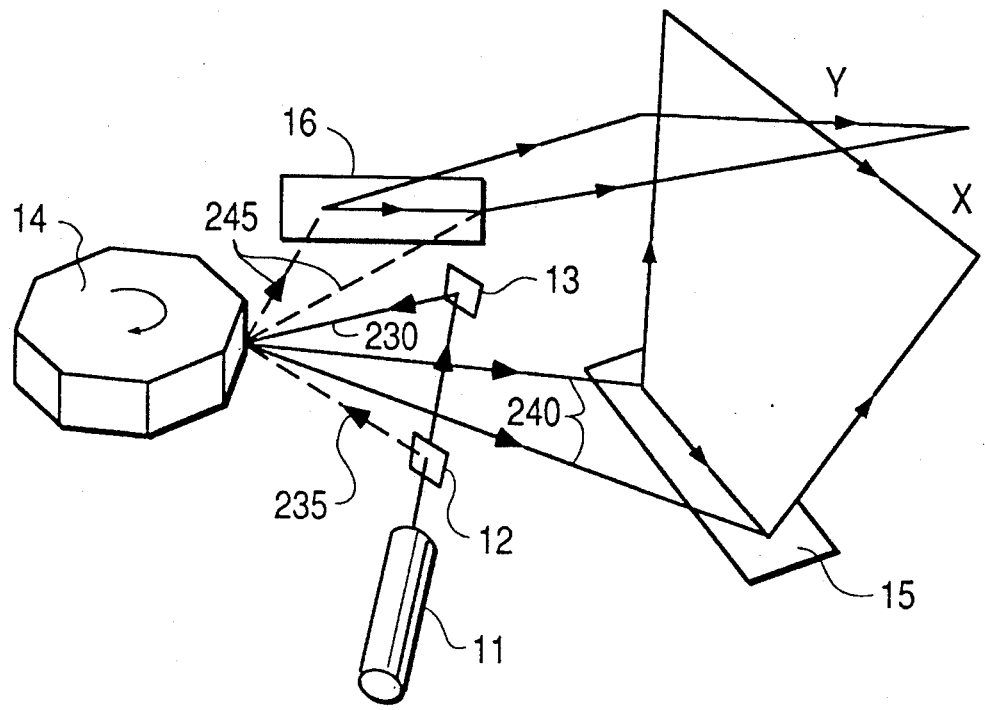
FIGS. 1(A) and 1(B) and 2(A) and 2(B) are views showing conventional bar code scanners.

Light beam scanners according to embodiments of the invention will be explained with reference to the drawings.

FIG. 3 shows the first embodiment of the invention. A laser source 30 is, for example, an He-Ne laser or a semiconductor laser for emitting a laser beam 100. A scanning optical system 31 scans an object 38 with the laser beam. The scanning optical system 31 comprises a first scanning means 32 for scanning the object in a first scanning direction, e.g., the direction of an axis X, a second scanning means 33 for scanning the object in a second scanning direction, e.g., the direction of an axis Y, a beam splitter 110, an object lens 120, and other optical elements (not shown) such as lenses and mirrors.

The first scanning means 32 comprises an acousto-optic deflection element (hereinafter referred to as the AO) for deflecting a light beam in the direction of the axis X.

The second scanning means 33 comprises a deflection prism having a special shape, i.e., having an incident surface, an outgoing surface, and a reflection surface between the incident and outgoing surfaces, as will be explained later. The position of the reflection surface is geometrically changed to deflect a light beam in the direction of the axis Y.

A first scanning means controlling portion 34 controls the first scanning means (AO) 32. The controlling portion 34 supplies a control signal 140 to the AO 32 to control a deflection (diffraction) angle. The control signal 140 is a ramp wave signal whose voltage continuously changes. The deflection angle changes in response to a ramp voltage, and a laser beam scans the object 38 at a position corresponding to the deflection angle.

A second scanning means controlling portion 35 produces a control signal 150 for moving the reflection surface of the second scanning means (deflection prism) 33 in the direction of the axis Y. A moving means 36 is, for example, a piezotranslator (hereinafter referred to as the PZT) for moving the reflection surface of the prism 33 in parallel with the axis Y. The control signal 150 is a step voltage signal whose voltage changes stepwise. The PZT 36 moves in response to the voltage to move the reflection surface of the deflection prism 33 in parallel with the axis Y.

A turn controlling means 37 is, for example, a step motor for turning the deflection prism 33. The turn controlling means 37 turns the reflection surface of the prism 33 around an optical axis for a set angle. A turn controlling signal is generated by the second scanning means controlling portion 35.

The light beam 100 from the AO 32 for controlling the light beam in the first direction, i.e., the direction of the axis X enters the incident surface of the deflection prism 33, i.e., the second scanning means. The light beam advances inside the deflection prism 33, is reflected by the reflection surface, further advances inside the deflection prism, and comes out of the outgoing surface of the prism to run in parallel with the optical axis.

When the reflection surface of the deflection prism 33 is moved by "h" in the direction of the axis Y from a reference position at which the reflection surface is orthogonal to the axis Y, the position of the beam which runs in the X-axis direction is shifted by "2h" on the axis Y. Namely, the light beam moves on the object in the direction of the axis Y for a distance two times the shifted distance of the reflection surface. At this time, the X-axis scanning direction is unchanged.

When the reflection surface of the deflection prism 33 is turned, the scanning direction changes from the X-axis direction to the Y-axis direction by an angle two times a turned angle. Namely, $\theta$-axis conversion is done on a plane X-Y. When the reflection surface of the prism 33 is moved along the axis Y with the turn, the light beam can be moved in parallel in the changed scanning direction. In this way, raster scan is carried out in an optional direction on the plane X-Y. The raster scan in the changed direction is done by moving the reflection surface of the deflection prism 33 after turning the reflection surface. If the prism 33 is moved and turned simultaneously, the light beam can scan the object along an elliptical locus.

The light beam coming out of the deflection prism 33 is converged into a fine spot by the object lens 120 to two-dimensionally scan a two-dimensional pattern formed on the object 38. A reflected light beam from the object 38 is reflected by the beam splitter 110, and a light receiving portion 160 detects the reflected beam 130 from the beam splitter 110. A data processing portion 170 processes the reflected beam 130, thereby measuring the two-dimensional pattern. According to the embodiment, the beam splitter 110 for deflecting the reflected beam from the object 38 toward the light receiving portion 160 may be disposed on the object 38 side of the first scanning means 32.

In the embodiment of FIG. 3, the second scanning means (deflection prism) 33 is provided with the moving means 36 for vertically or horizontally moving the second scanning means 33 with respect to the optical axis, and the turn controlling means 37 for turning the second scanning means 33 around the optical axis for an optional angle. According to the invention, the second scanning means 33 may have at least one of the moving and turning means 36 and 37. A basic technical idea of the invention is that a light beam is deflected by a movable deflection prism in an optional direction that is different from a first scanning direction, thereby two-dimensionally scanning an object with the light beam. Most preferably, the second scanning means 33 is provided with both the moving and turning means 36 and 37.

An example of the deflection prism, i.e., the second scanning means 33 will be explained with reference to FIG. 4.

In the figure, the second scanning means (deflection prism) 33 comprises an equilateral triangle prism 40 having an apex angle of 60 degrees, and a rectangular prism 41 having apex angles of 30 degrees and 60 degrees. These two prisms are combined as shown in the figure. A surface 200 for the equilateral triangle prism 40 is the incident surface, a surface 210 of the rectangular prism 41 is the reflection surface, and a surface 220 of the rectangular prism 41 is the outgoing surface. The incident and outgoing surfaces 200 and 220 are arranged orthogonally to the advancing direction (the direction of Z) of a laser beam. This is to prevent the shape of an incident beam from deforming due to astigmatism when the beam is divergent or convergent light.

An incident beam 230 for X-axis scanning enters the incident surface 200, transmits the incident surface 200, reflected at a point "a" of another surface 240 of the equilateral triangle prism 40, reflected at a point "b" of the reflection surface 210 which is a bottom surface of the rectangular prism 41, reflected at a point "c" of another surface 250 of the prism 41, and comes out of the outgoing surface 220 as an outgoing beam 260 whose optical path is in parallel with that of the incident beam 230. In the prism, the beam advances along a V-shaped optical path connecting the reflection points a, b, and c. In this arrangement, the incident surface 200 and outgoing surface 220 are always kept orthogonal to the incident beam 230, and the geometrical position of the reflection surface 210 is changed by use of the moving means 36 or the turning means 37.

When the reflection surface 210 of the deflection prism 33 is moved by the PZT (moving means) 36 by a distance of h along the axis Y, the position of the incident surface 200 changes relative to the incident beam 230, so that the reflection position on the refection surface 210 shifts in the direction Z. As a result, an outgoing beam from the outgoing surface 220 shifts along the axis Y by a distance of 2h, thereby scanning the object in the direction of the axis Y.

At this time, the beam follows a V-shaped optical path shifted in the direction of Z inside the prism 33, so that the outgoing beam from the prism 33 is in parallel with the incident beam. The incident beam to the incident surface 200 is stationary in the direction of the axis Y because it is for X-axis scanning.

When the reflection surface 210 of the prism 33 is turned by the turn controlling means 37 around a center axis 42 by an angle of $\theta$, the reflection position on the reflection surface 210 relative to the direction of Z changes depending on the scanning position in the direction of the axis X. As a result, the scanning direction of an X-axis scanning light beam is changed by an angle of $2\theta$ which is two times the turn angle $\theta$ of the reflection surface 210.

When the reflection surface 210 is moved in the direction of the axis Y after the reflection surface 210 is turned by the angle of $\theta$, the light beam shifts in parallel in the scanning direction that is turned by $2\theta$ from the axis X. As a result, raster scan in the direction of angle $2\theta$ is realized on a two-dimensional plane.

The above scanning operations are realized only by changing the geometrical position of the reflection surface 210 of the prism 33 with no particularly complicated scan drive signals. Namely, with a simple arrangement, it is possible to scan an object along the Y axis and along a direction inclined by an angle $\theta$ with respect to the Y axis.

Figure 5:
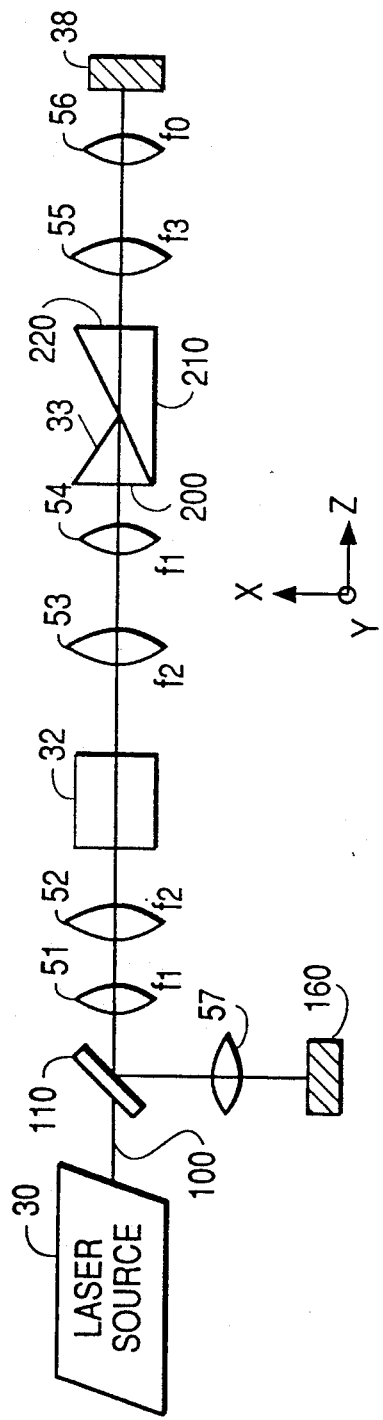
FIG. 5 is a view showing a scanning optical system according to the first embodiment of the invention.

Next, a concrete example of the scanning optical system 31 employed by the above embodiment will be explained with reference to FIG. 5.

In the figure, cylindrical lenses 51 and 54 have a focal length f1, convex lenses 52 and 53 have a focal length f2, convex lens 55 has a focal length f3, and an object lens 56 has a focal length f0.

The laser source 30 emits a circular laser beam 100, which is converted by a combination of the cylindrical lens 51 and convex lens 52 into a sheet-like beam which has a width in plane that is in parallel with the surface of the figure and condensed in a plane that is orthogonal to the surface of the figure. This is to improve deflection efficiency of the first scanning means 32. The cylindrical lens 51 is so arranged to provide a refraction action only in the plane that is in parallel with the surface of the figure. The sheet-like beam irradiates the first scanning means (AO) 32, which diffracts the beam in the plane that is in parallel with the surface of the drawing. The diffracted beam alone is needed for deflection, so that non-diffracted light is cut.

A combination of the convex lens 53 and cylindrical lens 54 sends the diffracted light beam in parallel with an optical axis and converts the sheet-like beam into a circular beam. The cylindrical lens 54 is so arranged as to refract the beam only in the plane that is orthogonal to the surface of the drawing. The focal point of the convex lens 53 must be the same as that of the cylindrical lens 54, and therefore, the cylindrical lens 54 is arranged before the focal point of the convex lens 53. At this focal point, the light beam is again converted into a circular shape beam.

The beam then enters as divergent light the incident surface 200 of the prisms 33, comes out of the outgoing surface 220 of the prism 33, and irradiates the convex lens 55, which converts the beam into collimated light. The collimated light is condensed by the object lens 56 into a fine spot, which advances in parallel with the optical axis to irradiate the surface of the object 38.

The voltage of the signal 140 as shown in FIG. 3 for driving the first scanning means (AO) 32 is changed to change the diffraction angle of the AO 32 and scan the object with the light beam. When a deflection angle at the AO 32 is $\phi$, a scan length Dx in the direction of the axis X on the surface of the object 38 is expressed as follows:

$$Dx = f0 \times f2 \times \phi/f3.$$

When the reflection surface 210 of the prism 33 is moved by a distance of h in the direction of the axis Y, a scan length Dy in the direction of the axis Y on the surface of the object 38 is expressed as follows:

$$Dy = 2h \times f0/f3.$$

The deflection angle $\phi$ of the AO 32 is about 3 mrad. By setting the focal lengths of the lenses to proper values, the scan lengths can freely be set. At this time, a ramp wave voltage for driving the AO 32 and a step voltage for driving the moving means (PZT) 36 are divided so that the scan length DX and the scan length DY are equally divided into 2000 steps to scan the object 38 at a fine scanning step length. As a result, a fine pattern on the object 38 can be measured with sufficient spatial resolution.

A reflected beam from the object 38 advances reversely, is reflected by the beam splitter 110, condensed by a convex lens 57, and detected by the light receiving portion 160. A light receiving position on the light receiving portion 160 has a confocal relationship with the surface of the object 38 and stationary with respect to deflection, so that an intensity distribution of the reflected light corresponding to the geometrical distribution of the object 38 can be measured always at a constant point.

Figure 6B:
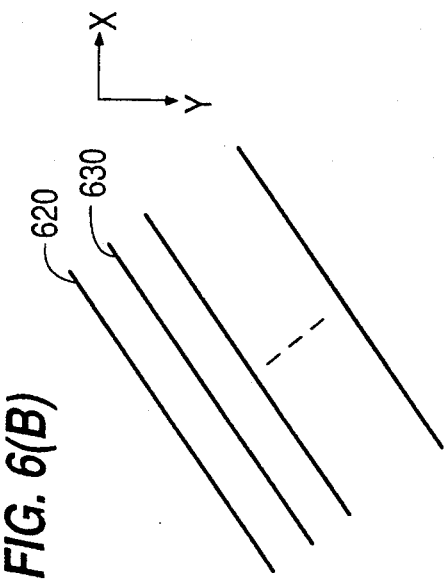
FIGS. 6(A) and 6(B) are views showing an example of conversion of a scanning direction.
Figure 6A:
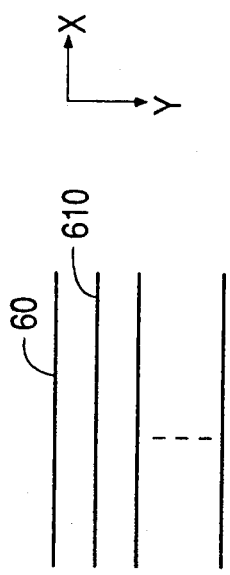

FIGS. 6(A) and 6(B) show examples of changes of a scanning direction. In FIG. 6(A), the prism 33 is in a reference state where a turn angle $\theta$ of the reflection surface 210 of the prism 33 is zero, and the moving means 36 is operated. A line 60 denotes a locus of a scanning beam that is deflected by the AO 32 to scan in the direction of the axis X. The position of the reflection surface 210 on the axis Y is at a reference position. A line 610 denotes a locus of the scanning beam with the reflection surface 210 being moved by the PZT 36 in the direction of the axis Y. In this way, raster scan is carried out two-dimensionally in the directions of the axes X and Y.

In FIG. 6(B), the reflection surface 210 of the prism 33 is rotated for angle of $\theta$ of 22.5 degrees. In this case, a scanning light beam is inclined by an angle of 45 degrees. A line 620 denotes a locus of the X-axis scanning beam that is inclined by 45 degrees scanned, by the AO 32 and at the reference position on the axis Y. A line 630 denotes a locus of the inclined scanning beam with the reflection surface 210 being moved by the PZT 36 in the direction of the axis Y. The lines 620 and 630 are in parallel with each other. In this way, two-dimensional raster scan is carried out along a 45-degree inclined axis on the plane X-Y.

The scanning by the AO 32 is performed at high speed. Since the invention can optionally change a scanning direction, the AO 32 can scan an object in the optional direction other than the direction of the axis X at high speed.

In the above embodiment, the scanning optical system 31 employs two scanning means, i.e., the first scanning means 32 for scanning an object with a light beam in a first scanning direction, e.g., the direction of the axis X, and the second scanning means 33 for scanning the object with the light beam in a second scanning direction, e.g., the direction of the axis Y. With the reflection surface of the second scanning means being in the reference state, a light beam for scanning the object in the first axial direction enters the second scanning means, and the reflection surface is moved in the second axial direction to carry out raster scanning on a two-dimensional plane of the object. At this time, the first axial scanning direction is kept as it is, while the reflection surface of the second scanning means is rotated around an optical axis to change the geometrical arrangement. As a result, the light beam for scanning the object in the first axial direction is inclined by an angle two times the turn angle. By moving the reflection surface of the second scanning means simultaneously in the second axial direction, the light beam entering the second scanning means to scan the object in the first axial direction is shifted relatively in the second axial direction. As a result, the light beam is shifted in parallel with the scanning direction determined by the turn of the reflection surface. In this way, the light beam can two-dimensionally scan the object in optional directions on the plane X-Y.

The second embodiment of the invention will be explained with reference to FIG. 7.

This embodiment has a third scanning means 70 for scanning an object with a light beam in the same direction as that of the second scanning means of FIG. 3. A scanning optical system of the second embodiment will be explained with reference to FIG. 7. Lenses of this system are the same as those of FIG. 5. The third scanning means 70 for scanning an object in the second axial direction, e.g., the direction of the axis Y comprises, for example, a galvanomirror (hereinafter referred to as the GM) which is disposed between a convex lens 53 and a cylindrical lens 54.

Compared with the PZT 36 as shown in FIG. 3, the GM 70 has a high scanning speed but low scanning resolution. In spite of the low scanning resolution, the GM 70 has a large scanning angle, which may enlarge a scanning range. In scanning an object in a direction orthogonal to the scanning direction of the first scanning means AO 32, both the GM 70 and prism 33 may be used to improve the scanning speed. The GM 70 coarsely moves a light beam at high speed in the direction orthogonal to the scanning direction of the AO 32, and then the PZT 36 precisely moves the reflection surface 210 of the prism 33, thereby improving a total scanning speed and correctly irradiating a measuring position on the object with the light beam.

Figure 7:
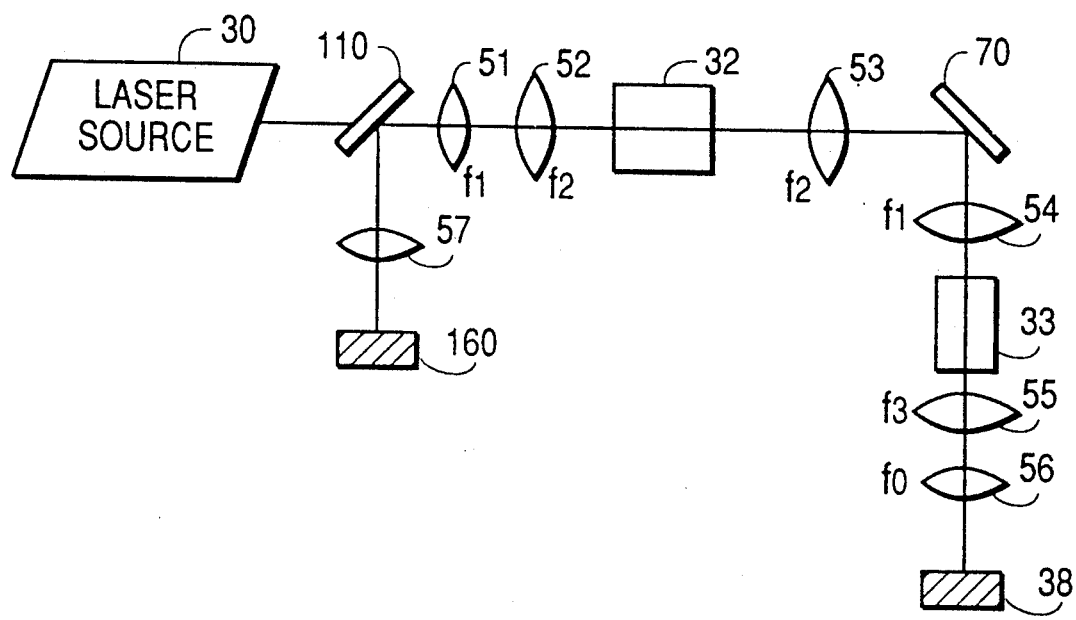
FIG. 7 is a view showing a scanning optical system according to a second embodiment of the invention.
Figure 8A:
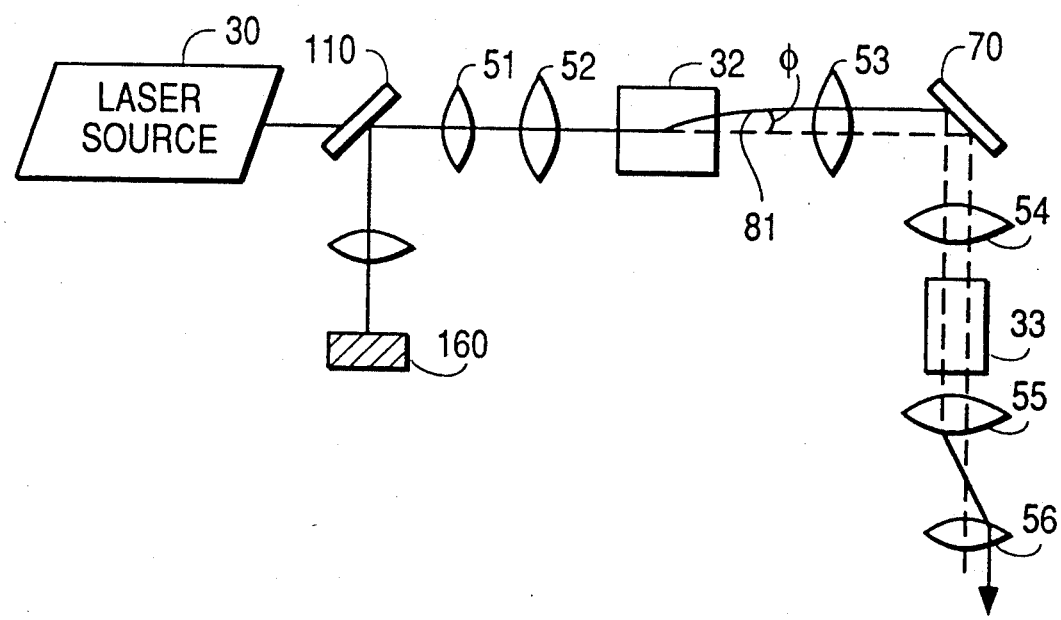
FIG. 8(A) is a view showing an X-axis light path of the scanning optical system of FIG. 7.
Figure 8B:
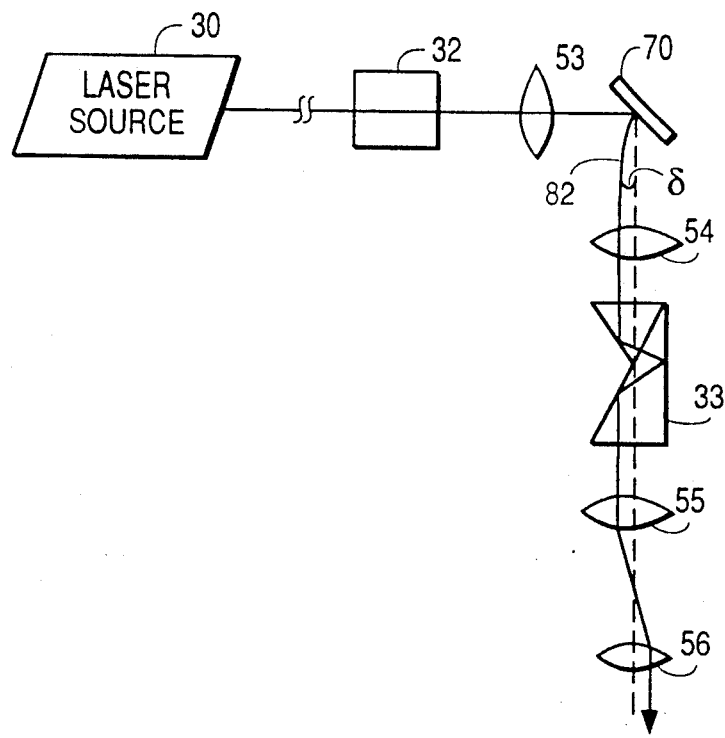
FIG. 8(B) is a view showing a Y-axis light path of the scanning optical system of FIG. 7.

FIGS. 8(A) and 8(B) show scanning optical paths of the scanning optical system of FIG. 7. FIG. 8(A) is a scanning optical path in the direction of the axis X realized by the AO 32. The AO 32 diffracts a light beam 81 by an angle $\phi$ in the direction of the axis X, and the convex lens 53 sends the light beam in parallel with the optical axis. The GM 70 then reflects the light beam. The GM 70 is for scanning an object in the direction of the axis Y, so that the light beam reflected by the GM 70 advances in parallel with the optical axis in the direction of the axis X, and enters the prism 33. At this time, the light beam is not refracted in the direction of the axis X by the cylindrical lens 54.

Figure 4:
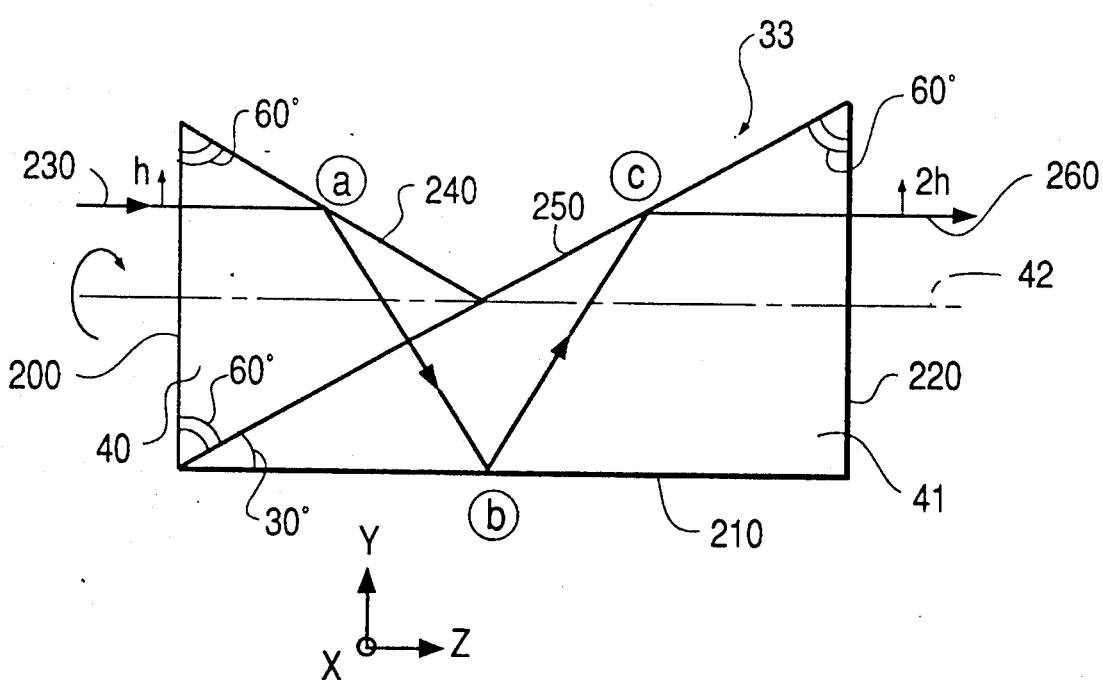
FIG. 4 is an example of a deflection prism of the invention.

In the prism 33, the position on the axis Y of an outgoing beam changes depending on the position of the reflection surface 210 as shown in FIG. 4 of the prism 33 on the axis Y. Also, the scanning direction is changed depending on the turn of the reflection surface 210. When the reflection surface 210 is at the reference position where the turn angle $\theta$ is zero, the optical path in the direction of the axis X does not change.

The outgoing beam from the prism 33 is refracted by the convex lens 55 in the direction of the axis X, and the object lens 56 sends the light beam in parallel with the optical axis to irradiate the object 38.

FIG. 8(B) shows a scanning optical path in the direction of the axis Y. The AO 32 does not diffract the optical beam in the direction of the axis Y, and a reflection angle $\delta$ of the GM 70 is changed to scan the object in the direction of the axis Y. A light beam 82 deflected by the GM 70 is refracted by the cylindrical lens 54, and advances in parallel with the axis Y. After entering the prism 33, the beam is changed in the direction of the axis Y according to a movement of the reflection surface 210, and comes out of the prism 33 on an optical path that is in parallel with an incident optical path. After the prism 33, the beam traces the same optical path as that of FIG. 8(A).

A scanning length Dg of a light beam in the direction of the axis Y due to the GM 70 is expressed as follows:

$$Dg = 2h \times \delta \times f1 \times f0/f3$$

where h is a change in the direction of the axis Y of an incident beam entering the incident surface 200 of the prism 33.

In the above arrangement, one of the GM 70 and prism 33 is stopped scanning while the other is being driven.

Figure 9:
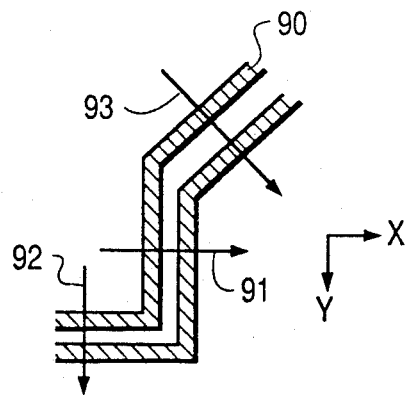
FIG. 9 is a view showing an example of a two-dimensional pattern measured with the scanner of the invention.

FIG. 9 shows an example of a two-dimensional pattern to be measured with the light beam scanner of the invention. A two-dimensional pattern 90 shown in the figure is a transparent electrode pattern which is formed on a glass substrate and extends in optional directions on a plane X-Y. It is necessary to detect cuts and shorts on the transparent electrode pattern. In detecting and measuring such a pattern, it is usual to scan the pattern with a fine spot of laser beam and detect changes in reflected light. To detect cuts on the pattern, the pattern must be scanned to along the pattern. To detect shorts, the pattern must be scanned in a crosswise direction.

A line 91 denotes scan in the direction of axis X. For this sort of scan, the reflection surface 210 of the prism 33 is set to the reference position where the turn angle $\theta$ is zero. A line 92 denotes scan in the direction of axis Y. For this scan, the reflection surface 210 of the prism 33 is rotated by 45 degrees ($\theta=45$). A line 93 indicates scan in the direction inclined by 45 degrees from the axis Y. For this scan, the reflection surface 210 is rotated by 22.5 degrees. When a pitch between patterns is short, the prism 33 is moved by the PZT 36 for scanning the pattern in the direction orthogonal to the scanning direction of the AO 32. When the pitch is long, the GM 70 coarsely changes the scanning direction, and the prism 33 precisely changes the scanning direction, thereby shortening the measuring time.

Next, a light beam scanner according to the third embodiment of the invention will be explained.

According to this embodiment, a light beam scanning range and scan resolution of a first scanning means 32 are set differently. For example, a rough region is scanned at first, and then a specific fine region in the rough region is precisely scanned. To achieve this, the first scanning means 32 has scanning elements having different scanning ranges. Namely, a light beam scanner according to this embodiment comprises the first scanning means involving at least two kinds of first and second scanning elements 321 and 322 having different scanning ranges and resolutions, and a second scanning means 33 involving a deflection prism having an incident surface, an outgoing surface, and a reflection surface disposed between the incident and outgoing surfaces. The scanner further comprises a scan controlling portion 133 for driving the first and second scanning elements 321 and 322, and a turn/shift controlling portion 180 for turning the second scanning means 33 or shifting the same in parallel with an optical axis.

The scan controlling portion 133 controls first scanning element 321 to scan a first region of the incident surface of the deflection prism (the second scanning means) 33 (as shown in FIG. 4, for example), and the second scanning element 322 to scan a second narrow region which is in the first region of the incident surface of the deflection prism 33. A light beam for scanning the first or second region is made incident to the second scanning means (deflection prism) 33, and the turn/shift controlling means 180 turns or shifts the reflection surface of the prism 33 in a plane that is orthogonal to an optical axis, thereby changing the scanning direction of a light beam coming out of the outgoing surface of the prism 33.

The deflection prism (the second scanning means) 33 according to this embodiment is preferably the same as the deflection prism of FIG. 4.

Operation of the third embodiment of the invention will be explained with reference to FIG. 10.

In the figure, a laser source 30 is, for example, an HeNe laser or a semiconductor laser for emitting a laser beam 100. A scanning optical system 31 comprises the first scanning means 32, second scanning means 33, a beam splitter 110, and an object lens 120. The first scanning means 32 comprises the first scanning element 321 and second scanning element 322. The first scanning element 321 is, for example, a galvanomirror which has a large scan angle and low scan resolution. The first scanning element 321 controls a light beam in the direction of, for example, an axis X. The second scanning element 322 comprises, for example, an acousto-optic deflection element (AO) having a smaller scan angle and higher scan resolution compared with those of the first scanning element 321. The second scanning element 322 controls a light beam in the direction of, for example, the axis X. A scanning range of the second scanning element 322 is narrow and inside a scanning range of the first scanning element 321.

An arrangement of the first and second scanning elements 321 and 322 is not restricted to the one shown in FIG. 10. The number of beam scanning portions incorporated in each of the scanning elements may be two for the first scanning element 321, and one for the second scanning element 322, and vice versa.

The beam splitter 110 transmits most part of a light beam coming from the first and second scanning elements 321 and 322.

In the figure, the first scanning element 321 has two beam scanning portions, i.e., a first scanning portion 323 and a second scanning portion 324. The first scanning portion 323 controls a light beam in the direction of, for example, the axis X, and the second scanning portion 324 controls the light beam in the direction of, for example, the axis Y, thereby carrying out two-dimensional raster scan on a plane X-Y.

In this way, the scanning optical system 31 comprises the first and second scanning elements 321 and 322, beam splitter 110, and many other lenses (not shown) to change the shape of the laser beam 100 and set a scanning width.

The scan controlling portion 133 comprises a first scan controlling portion 121 for driving the first and second scanning portions 323 and 324 of the first scanning element 321, and a second scan controlling portion 131 for driving the second scanning element 322. The first scan controlling portion 121 provides two channels of driving signals 122 and 124. The signal 122 is a ramp wave signal whose voltage continuously changes to continuously change a scan angle of the first scanning portion 323. The signal 124 is a step voltage signal whose voltage changes stepwise. The voltage changes in synchronism with the frequency of the signal 122, thereby changing a scan angle of the second scanning portion 324 stepwise.

The second scan controlling portion 131 provides a channel of driving signal 132. The signal 132 is, similar to the signal 122, a ramp wave voltage signal for continuously changing a scan angle of the second scanning element 322. When the first scan controlling portion 121 is operating for scanning, the second scan controlling portion 131 is stopped to operate. Namely, it is preferable to put only one of them in a scanning state.

As mentioned above, the second scanning means 33 comprises the deflection prism. The turn/shift controlling portion 180 provides a control signal 162 in response to which the deflection prism 33 is turned for a predetermined angle around an optical axis 107 or shifted in parallel with the optical axis. According to the embodiment, the turn and shift can simultaneously be made. When a light beam for two-dimensionally or linearly scanning the object enters an incident surface 200 of the deflection prism (the second scanning means) 33, the scanning direction of an outgoing beam from the prism 33 changes due to the principle explained before. Thereafter, the light beam enters the object lens 120, which condenses the light beam into a fine spot to scan the object 38 in an optional direction.

A reflected beam from the object 38 passes through the object lens 120, is transmitted through the deflection prism 33, is reflected by the beam splitter 110, and detected by a light receiving portion 160. Intensity of the reflected beam detected by the light receiving portion 160 is photoelectrically converted into electric signals, which are processed by a data processing portion 170 to measure the shape and size of a target part on the object.

Figure 11A:
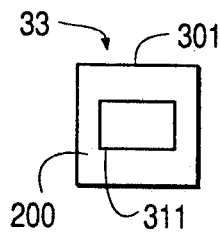
FIGS. 11(A) and 11(B) are views explaining scanning ranges on an incident surface of a deflection prism.
Figure 11B:
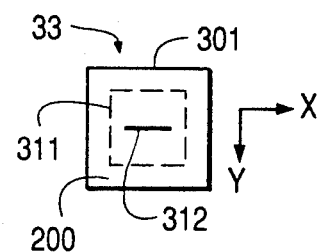

FIGS. 11(A) and 11(B) show scanning regions of a scan beam on the incident surface 200 of the deflection prism 33, corresponding to the equilateral triangle prism 40. Numeral 301 denotes a square side view representing the incident surface 200 thereof.

A region 311 of FIG. 11(A) is a first two-dimensional region formed on the square side view 301 scanned by one of the first and second scanning portions 323 and 324 of the first scanning element 321 as shown in FIG. 10. When the first scanning element 321 has only one of the scanning portions 323 and 324, this first region will be linear. This first region 311 is wide and coarsely scanned.

FIG. 11(B) shows a second region 312 formed inside the first two-dimensional region 311 scanned by the second scanning element 322. The second region 312 is inside the first region 311 and is precisely scanned. The first and second regions 311 and 312 are scanned only in the direction of the X or Y axis and not in any other axial direction.

A scanning direction changing operation of the second scanning means (deflection prism) 33 will now be explained.

FIG. 12(A) explains a scanning direction on the incident surface 200 of the deflection prism 33, in which $\alpha$ denotes scan in the rightward direction along the axis X on the incident surface, and $\beta$ denotes scan in the downward direction along the axis Y on the incident surface.

In FIG. 12(B), (a) to (h) represent incident positions of the reflection surface 210 of the rectangular prism 41 and scanning directions of an outgoing light beam when the reflection surface 210 of the rectangular prism 41 is turned. These are the views seen from the incident side. In the deflection prism 33 of FIG. 4, the deflection surface 210 is in a plane extending in the direction of the axis X. The deflection prism 33 is entirely turned around an optical axis in a vertical plane, thereby turning the reflection surface 210. At this time, the reflection surface 210 is always kept in parallel with the optical axis.

In FIG. 12(B), the state (a) is a reference state with the turn angle $\theta$ of zero, the state (b) with $\theta=45$ degrees, (c) with $\theta=90$ degrees, (d) with $\theta=135$ degrees, (e) with $\theta=180$ degrees, (f) with $\theta=225$ degrees, (g) with $\theta=270$ degrees, (h) with $\theta=315$ degrees. The next state (a) is one turn.

In the state (a), the scanning beam $\alpha$ for scanning in the direction of the axis X comes out of the prism 33 as it is, while the scanning beam $\beta$ for scanning in the direction of the axis Y comes out of the prism 33 in a reverse Y-axis direction. This reverse direction is represented with $\bar{\beta}$.

In the state (b), the incident scanning beam $\alpha$ is rotated by 90 degrees to scan in the Y-axis direction. This scanning direction is represented with $\beta$. Also the incident scanning beam $\beta$ is rotated by 90 degrees to scan in a reverse X-axis direction. This reverse scanning direction is expressed with $\bar{\alpha}$. In other angular states, the scanning direction changes as shown in the figure. In this way, the scanning direction changes at an angle two times the turn angle of the reflection surface 210.

According to the present invention, the scanning direction is changed out in the forward and reverse directions such as $\alpha$ and $\bar{\alpha}$, but its orientation is changed, for example, from $\alpha$ to $\beta$.

The above-mentioned scanning direction changing operation can be realized with a known image rotating prism. The image rotating prism has incident and outgoing surfaces each inclined by 45 degrees relative to a vertical plane, so that, when divergent light or convergent light enters the prism, a problem rises of producing an elliptical beam due to astigmatism. Through an arrangement of a scanning optical system, it is possible to let coherent light enter the image rotating prism. In this case, the image rotating prism is acceptable.

Figure 13A:
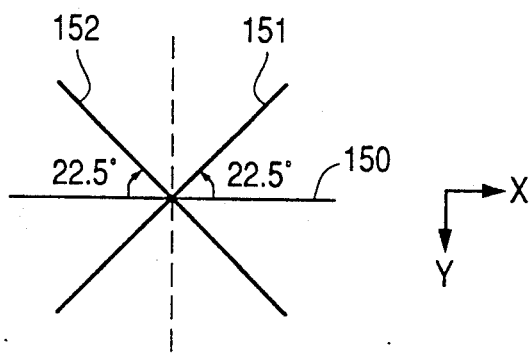
FIGS. 13(A), 13(B) and 13(C) are views showing changes of scanning direction.
Figure 13B:
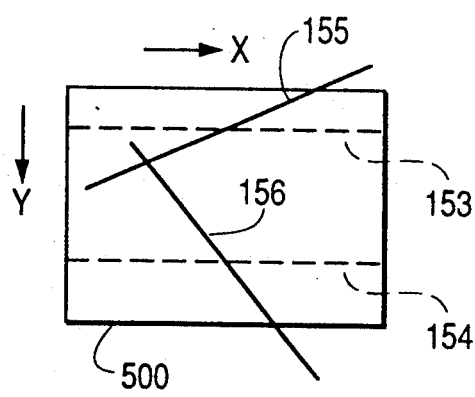
Figure 13C:
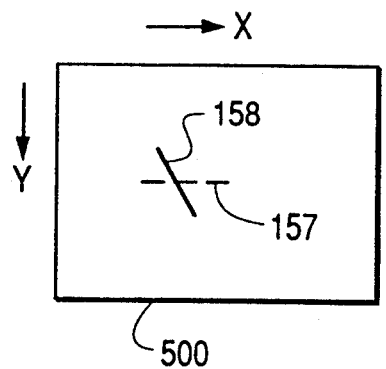

FIGS. 13(A), 13(B) and 13(C) show examples of changes in the scanning direction of a scanning beam. As is apparent in FIG. 12, the turn of plus or minus 90 degrees of a beam is realized by turning the reflection surface 210 by plus or minus 45 degrees if the scanning direction (for example the relationship of $\alpha$ and $\bar{\alpha}$) is not considered.

In FIG. 13(A), a line 150 is a reference scanning beam for scanning an object in the X-axis direction. A line 151 is a scanning beam inclined by 45 degrees relative to the axis X. This inclination is obtained by turning the reflection surface 210 by 22.5 degrees in a normal (forward) direction. A line 152 is a scanning beam inclined by minus 45 degrees relative to the axis X. This inclination is obtainable by turning the reflection surface 210 by 22.5 degrees in a negative (reverse) direction. In this way, the reflection surface 210 may be rotated by half a required angle in the normal or reverse direction.

FIG. 13(B) shows the case of changing the scanning direction of a scanning beam by controlling the first and second scanning portions 323 and 324 of the first scanning element 321. A two-dimensional region 500 corresponds to the above-mentioned first region. The region 500 is obtained when the reflection surface 210 is at an angle of zero and when the first scanning region entering the incident surface 200 comes out of the outgoing surface 220. A line 153 in the region 500 is a scanning beam for carrying out raster scan in the X-axis direction, and a line 154 is for carrying out the raster scan in the same X-axis direction. In this case, the turn angle of the reflection surface 210 is zero.

A line 155 is obtained by changing the scanning direction of the line 153. A line 156 is obtained by changing the scanning direction of the line 154. In each case, the direction is changed around the center of the axis X in the region 500.

In FIG. 13(C), the first and second scanning portions 323 and 324 of the first scanning element 321 are stopped, and the second scanning element 322 is operated. A line 157 indicates a scanning beam in the X-axis direction with the turn angle of the reflection surface 210 being zero. A line 158 indicates a scanning beam whose scanning direction has been changed by turning the reflection surface 210. In this way, a scanning beam can be oriented in an optional direction by turning the reflection surface 210 of the deflection prism 33.

Figure 14:
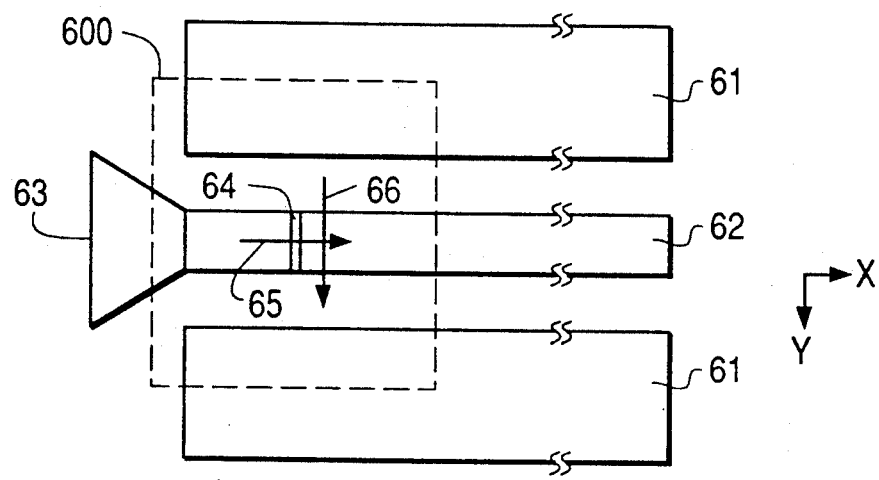
FIG. 14 is a view showing an application of the changes of scanning direction for actual measurement.

FIG. 14 shows an application of the light beam scanner of the invention for measurement and is a top view schematically showing a magnetic head. The magnetic head comprises sliders 61, a track portion 62, and a nose 63 around which a coil is wound. The track portion 62 has a gap 64. In this magnetic head, it is important to measure the width (about 0.5 micrometer in a direction X) of the gap 64, and the width (about 15 micrometers) of the track portion 62.

In the figure, a two-dimensional region defined by a dotted line 600 is a scan region to be scanned by the first and second scanning portions 323 and 324 of the first scanning element 321. This region is, for example, one millimeter square and scanned coarsely to determine the position of the gap 64. Once the position is determined, the second scanning element 322 is driven to precisely scan an area indicated with a line 65 (direction X) and measure the size of the gap 64.

To measure the width of the track portion 62, the scanning position is slightly shifted in the X-axis direction, and the deflection prism (the second scanning means) 33 is turned by 45 degrees to scan a line 66 along the axis Y. This scan is done in the same precision as the scan of the line 65 along the axis X.

Figure 15:
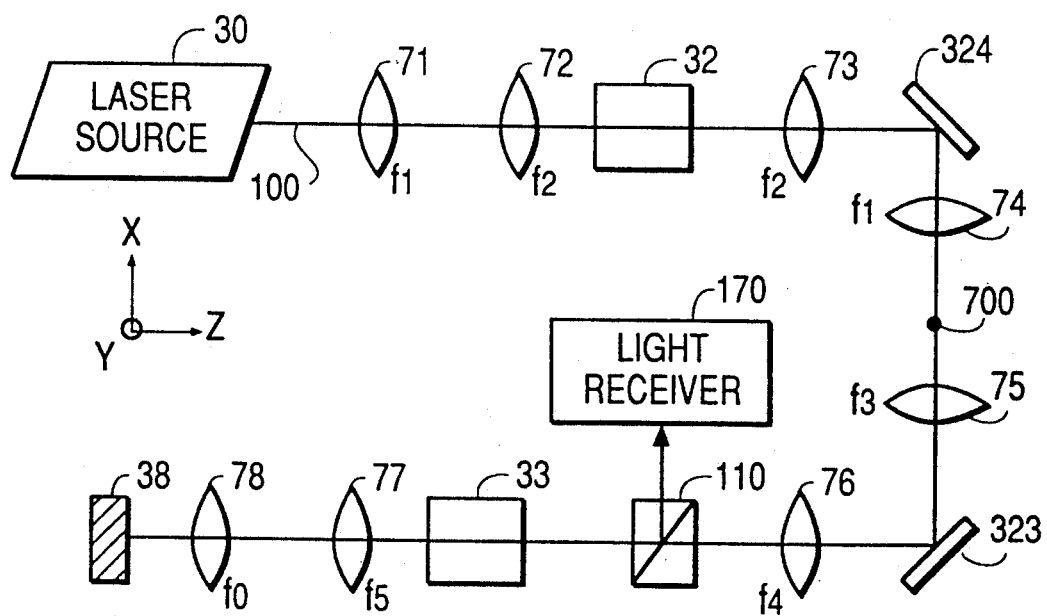
FIG. 15 is a view showing an example of a scanning optical system.

FIG. 15 shows a scanning optical system of a light beam scanner according to an embodiment of the invention.

In the figure, cylindrical lenses 71 and 74 have a focal length f1, convex lenses 72 and 73 have a focal length f2, a convex lens 75 has a focal length f3, a convex lens 76 has a focal length f4, a convex lens 77 has a focal length f5, and an object lens 78 has a focal length f0. A first scanning element 32 comprises an acousto-optic element AO for scanning a second region in the X-axis direction. A first scanning portion 323 and second scanning portion 324 comprise galvanomirrors GMX and GMY. The galvanomirror GMY scans the first region in the Y-axis direction, and the galvanomirror GMX scans the first region in the X-axis direction.

A laser source 30 emits a laser beam 100 having a circular cross section. The cylindrical lens 71 and convex lens 72 convert the laser beam into a sheet-like beam having a sector shape extending in a plane that is in parallel with the surface of the figure. After exiting the convex lens 72, the sheet-like beam as collimated beam extending in the plane that is in parallel with the surface of the figure enters the AO 32. In a plane that is vertical to the surface of the figure, the sheet-like beam is convergent light after the convex lens 72 and focused at the center of the AO 32. The beam from the AO 32 is converted in the plate that is in parallel with the surface of the figure, by the convex lens 73 into convergent light. The convergent light is reflected by the GMY 324, transmitted through the cylindrical lens 74, and is converged at a focal point 700.

In the plane vertical to the surface of the figure, divergent light from the AO 32 is converted by the convex lens 73 into collimated light, reflected by the GMY 324, refracted by the cylindrical lens 74, and condensed to the focal point 700. In an optical path after the rear focal point 700 of the cylindrical lens 74, the light beam has again the circular cross section.

The GMY 324 is disposed at a front focal point of the cylindrical lens 74, and a focal point of the convex lens 73 and that of the cylindrical lens 74 are arranged at the same point 700. Refraction planes of the cylindrical lenses 71 and 74 are arranged to differ from each other by 90 degrees.

The reason why the sheet-like beam is applied to the AO 32 is to sufficiently carry out an interaction of ultrasonic waves and light waves in the AO 32 and improve diffraction efficiency of the AO 32.

The laser beam converted into the beam of circular cross section at the point 700 is converted into collimated light by the convex lens 75, and reflected by the GMX 323, converted again into convergent light by the convex lens 76, transmitted through a beam splitter 110, and enters as divergent light an incident surface 200 of a deflection prism 33 as shown in FIG. 4. At this time, a reflection surface 210 of the deflection prism 33 is turned as mentioned before.

A laser beam from an outgoing surface 220 of the deflection prism 33 enters the convex lens 77, which converts the beam again into collimated light which enters the convex lens 78. The object lens 78 condenses the light into a fine spot, which scans the surface of an object 38. A reflected beam from the object 38 passes through the object lens 78, convex lens 77, and deflection prism 33, and is reflected by the beam splitter 110 and detected by a light receiver 170.

A range scanned at this time is determined by scan angles of the respective scanning elements and the focal lengths of the lenses used. When a scanning angle realized by the AO 32 is $\theta a$, a scan region DAO on the object is as follows:

$$DAO = f2 \times f4 \times f0 \times \theta a / (f3 \times f5).$$

When a scanning angle realized by the GMX 323 is $\theta x$, a scanning range Dgx on the subject is as follows:

$$Dgx = f4 \times f0 \times \theta gx / f5.$$

When a scanning angle realized by the GMY 324 is $\theta y$, a scanning range Dgy on the object is as follows:

$$Dgy = 2f1 \times f4 \times f0 \times \theta gy / (f3 \times f5).$$

In this way, the embodiment of the invention arranges in an optical path between the laser source and the object lens two kinds of light beam scanning elements having different scanning ranges and scan resolutions. The first scanning element has a large scan angle and relatively low scan resolution to coarsely two-dimensionally or linearly scan a relatively wide range. This scan is a preliminary scanning operation to roughly measure the shape, etc., of an object and determine a measuring position where precision measurement is to be carried out.

The second scanning element has a small scan angle and high scan resolution to two-dimensionally or linearly scan a range that is smaller than the scanning range of the first scanning element. The second scanning element carries out precision scanning to accurately scan the object at the position determined by the coarse scanning thereby determining the size and shape of the object. At this time, only one of the first and second scanning elements is operated, and when one of the scanning elements is operating, the other is stopped.

The direction of a light beam controlled by the first and second scanning elements is predetermined in the direction of the axis X or Y, and the scanning direction is freely changed by the second scanning means. The second scanning means employs the above-mentioned deflection prism, which is rotated or shifted to deflect the light beam optionally in an axial direction other than the axes X and Y. Namely, an object formed in axial directions other than the axes X and Y can orthogonally be scanned with a light beam.

Another embodiment of the present invention will be explained with reference to FIG. 19, hereunder.

Figure 19:
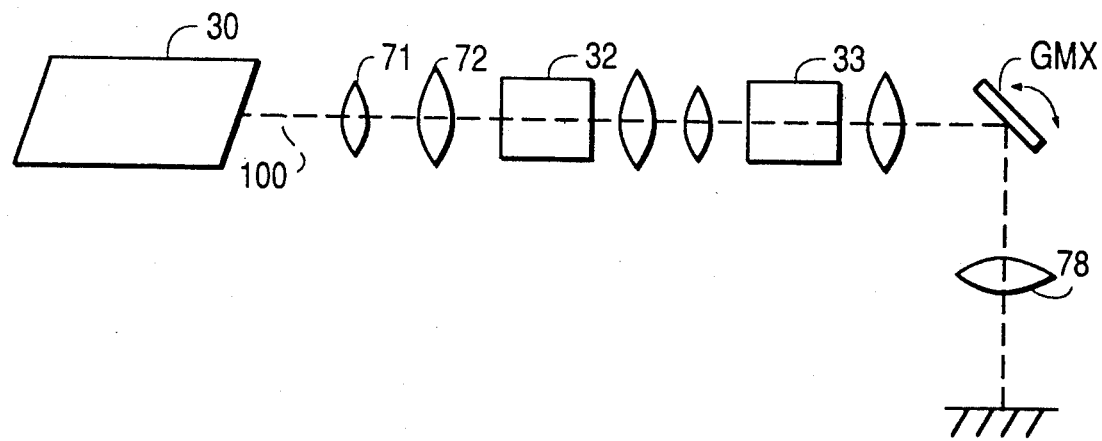
FIG. 19 shows a schematic diagram of another embodiment of the present invention.

FIG. 19 shows a schematic diagram of another embodiment of the present invention and a construction of an optical system of this embodiment is basically the same as the previous embodiment.

The technical feature of this embodiment is such that in this embodiment, a scanning optical system such as AO 32, a deflection prism 33 and a galvanomirror GMX are simultaneously used and the galvanomirror GMX is arranged before an object lens 78.

In this optical system, the scanning optical system 32 and the galvanomirror GMX both scann a laser beam 100 in one direction, for example, X direction but a rough scanning operation is carried out by the galvanomirror GMX while a precise scanning operation is carried out by the AO system 32.

Further, in this embodiment, the deflection prism 33 is arranged between the AO 32 and the galvanomirror GMX and thus when the deflection prism 33 as shown in FIG. 4 is rotated around a optical axis thereof, a scanning direction of the laser beam which is previously set to be scanned in a predetermined direction can be voluntarily changed.

In this system, the scanning operation is carried out in a manner such that when the AO 32 operates, the galvanomirror GMX stops to operate and when the galvanomirror GMX operates, the AO 32 stops to operate. And in this system, that galvanomirror GMX does not contribute to change the scanning direction of the laser beam but the AO 32 only contributes to change the scanning direction thereof.

Under a general operation in this system, the AO 32 changes its scanning area of the laser beam with respect to a reflection angle of the galvanomirror GMX and in this area the AO 32 changes its scanning direction of the beam.

A bar code scanner employing the light beam scanner of the invention will be explained with reference to FIG. 16.

Figure 16:
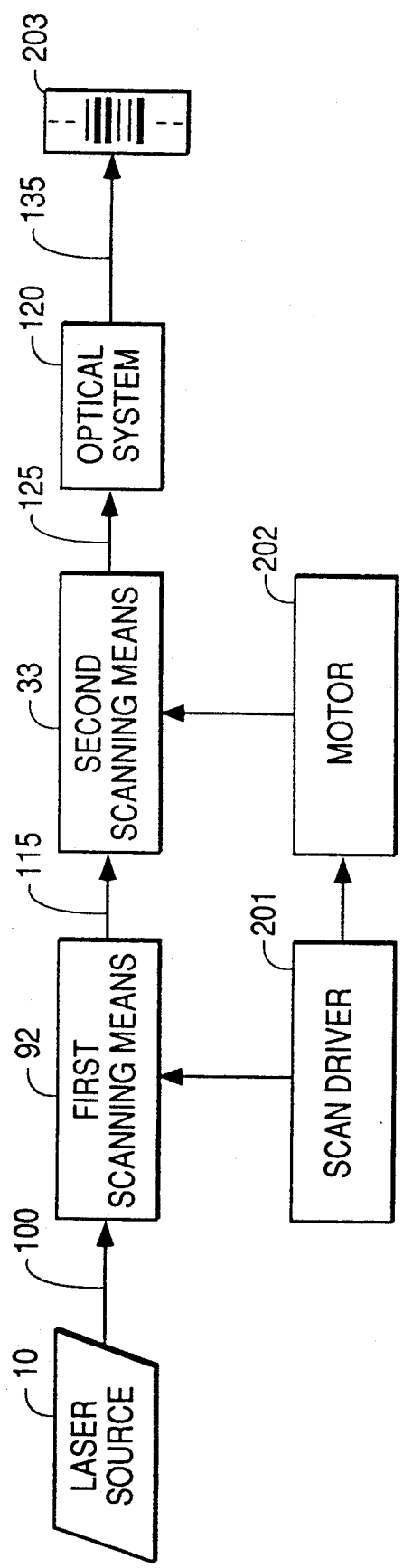
FIG. 16 is a view explaining the basic arrangement of a bar code scanner according to the invention.

In FIG. 16, the bar code scanner comprises a laser source 10 and a first scanning means 32 involving scanning elements such as lenses and a polygon mirror or a galvanomirror. The first scanning means 32 receives a laser beam 100 and deflects the laser beam in a plane that is orthogonal to an advancing direction of the beam toward a preset direction at a preset speed. A scan driver 201 controls the first scanning means 32.

A second scanning means 33 comprises the above-mentioned deflection prism as shown in FIG. 4, for changing the scanning direction of an outgoing beam 115 from the first scanning means 32. The deflection prism 33 is rotated by a motor 202 in a vertical plane that is orthogonal to the advancing direction of the laser beam in the prism 33. The speed of turning the prism 33 has a set relationship with respect to the scanning speed of the scan driver 201.

An outgoing beam 125 from the deflection prism 33 enters an optical system 120 comprising various lenses including an object lens. The optical system 120 enlarges a scanning range of the outgoing beam 125 whose scanning direction has been changed, and changes the shape of a beam. An outgoing laser beam 135 from the optical system 120 irradiates a bar code label 203.

In this way, the bar code scanner of the invention turns the reflection surface of the deflection prism 33, thereby changing the scanning direction of a light beam in response to a turn angle of the reflection surface. The scanning direction is changed at an angle two times the turn angle of the reflection surface. Since the invention changes the scanning direction on an optical axis on which the laser beam advances, the optical axis is unchanged.

Figure 17A:
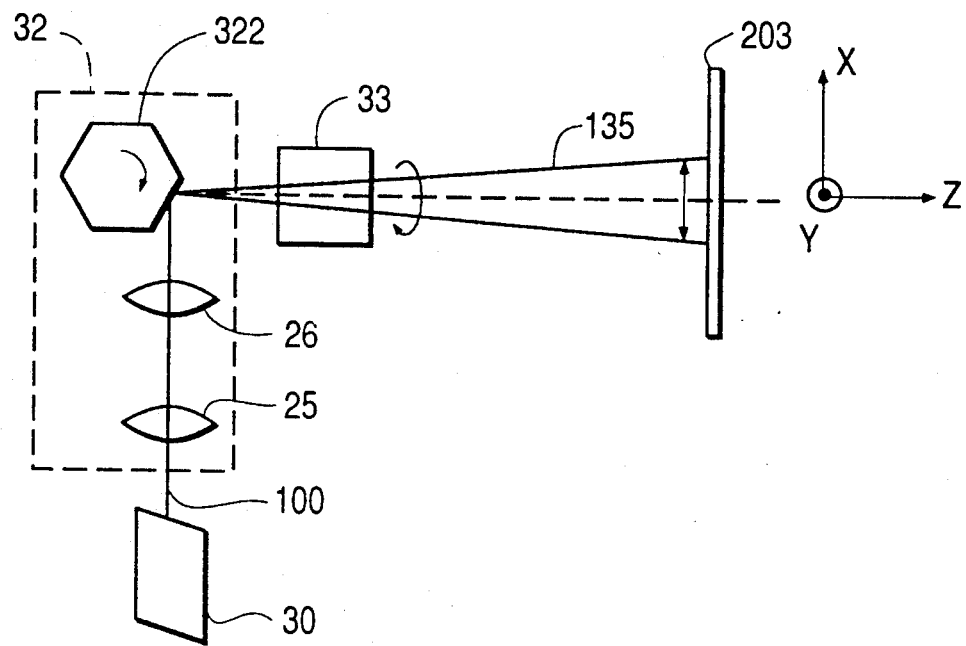
FIGS. 17(A) and 17(B) are views showing an example of an optical system of the bar code scanner according to the invention.

FIG. 17 shows a schematic diagram of one embodiment of a laser beam scanning system in the present invention.

As shown in FIG. 17, the laser beam scanning system of the present invention comprises a laser beam generating means 30, an optical system 32 for scanning the laser beam 100 in X direction comprising a convex lens 25, a cylindrical lens 26 and a polygonal mirror 322 and a deflection prism 33 as shown in FIG. 4, a refracting phase of which is displaced in a direction perpendicular to an optical axis thereof or is rotated around the axis.

In this system, a characteristic feature of this embodiment is such that the convex lens 25 and the cylindrical lens 26 are arranged between the laser beam generating means 30 and the polygonal mirror 322.

Note, that the cylindrical lens 26 is disposed at a position just before a focal point of the convex lens 25 and the cylindrical lens 26 refracts the laser beam in Y direction (corresponding to a direction perpendicular to a surface of this sheet), while doesn't in X direction.

Therefore, the laser beam is focused on the focal point of the convex lens 25 without being refracted by the cylindrical lens 26 in X direction while it is refracted by the cylindrical lens 26 in Y direction to form a beam widened in Y direction at the focal point of the convex lens 25.

Figure 17B:
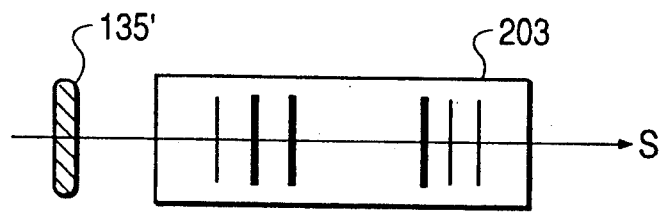

The cross-sectional configuration of the refracted laser beam 135 is shown in FIG. 17(b).

When the refracted laser beam 135 is scanned over a bar-code label in one direction, for example, X direction, it is refracted by the rotating polygonal mirror 322 to be scanned and introduced into the deflection prism 33.

At this stage, when the deflection prism 33 is rotated in synchronization with a rotation of the polygonal mirror 322, a scanning direction of the refracted laser beam 135 can be varied in response to the rotation of the deflection prism 33 thereby the laser beam 135 is radiated on a surface of a bar code label to scan the surface thereof in various directions to obtain accurate information from the bar code label.

In this embodiment, a laser beam radiated on the surface of the bar code label, has a cross sectional area such that it has a narrow and spot like configuration in X direction along which information to be obtained are arranged while has a widened width in Y direction along which information are extended and thus a ratio of S/N of the refracted laser beam from the surface of the bar code label is improved and a sensitivity for reading out informations will be increased compared with a conventional method in which a radiated laser beam to an object, for example, a bar code label has a spot having a circular cross sectional configuration.

Figure 1B:
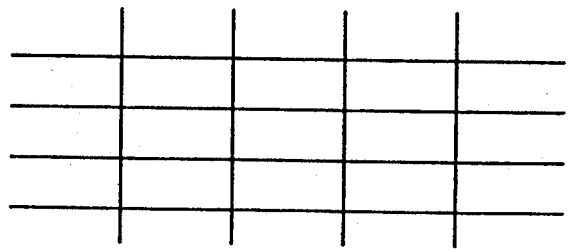
Figure 2A:
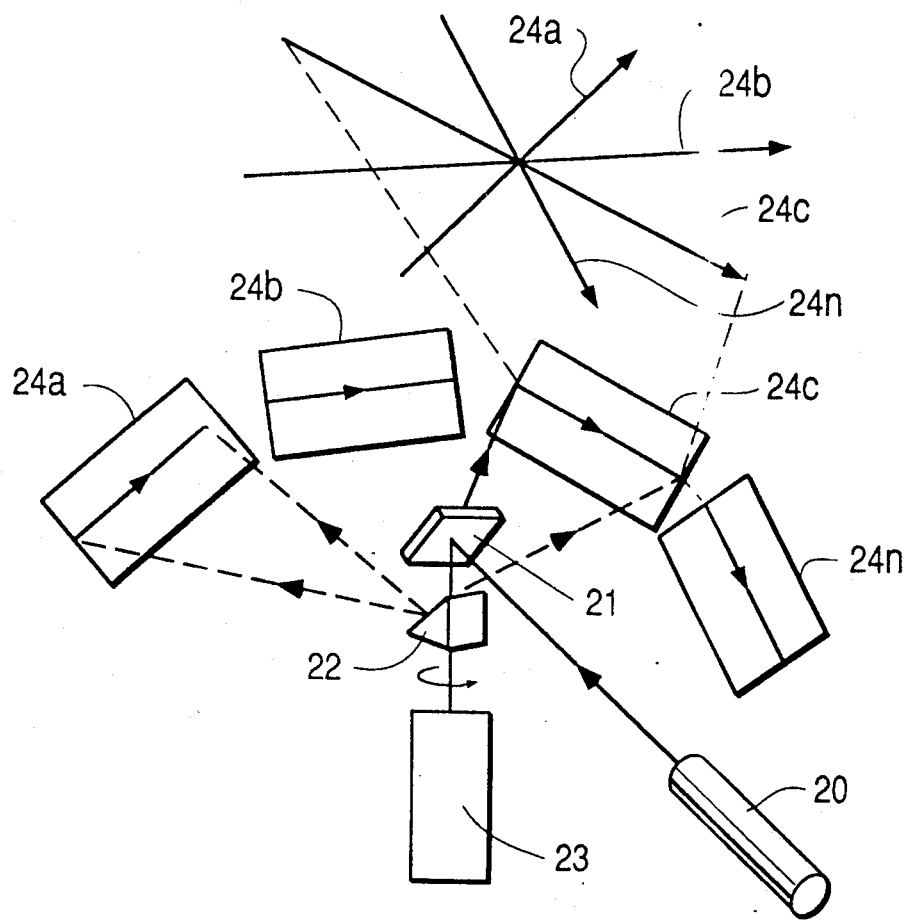
Figure 2B:
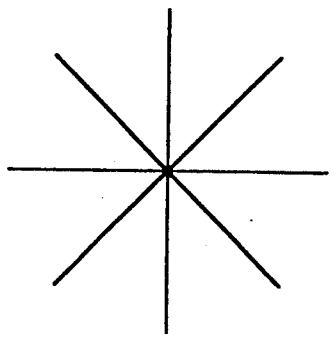

The scanning element 322 may be a polygon mirror of FIG. 1. With this polygon mirror and the refractors of FIG. 1, crosswise scanning beams are formed which are provided to the deflection prism. In this case, the two orthogonal scanning beams are simultaneously turned to improve scanning speed.

Figure 18:
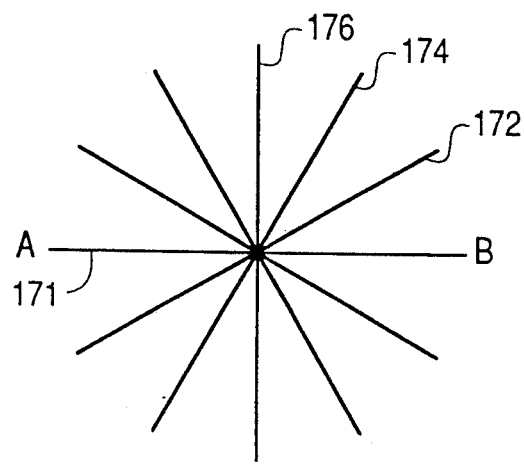
FIG. 18 is a view showing a scanning pattern obtained by the deflection prism of the invention.

FIG. 18 shows an example of a radial scanning pattern obtained by rotating the deflection prism 33 of the invention. A line 171 indicates a scanning line in the direction of AB obtained by the first scanning means 32. When the scanning beam in the direction of the line 171 enters the incident surface 200 of the deflection prism (the second scanning means) 33, the reflection surface 210 is turned to provide scanning direction rotated beams 172, 174, 176, etc.

In this way, according to this embodiment, the laser source emits a laser beam, which is linearly or two-dimensionally deflected by the scanning element of the first scanning means in a set direction in a vertical plane orthogonal t the advancing direction of the laser beam. Then the beam enters the incident surface of the deflection prism. When the reflection surface of the deflection prism is rotated at a certain speed in a vertical plane orthogonal to the advancing direction of the beam, reflected direction of the beam changes in response to the turn of the reflection surface. As a result, with respect to a scanning direction on the incident surface of the deflection prism, a scanning direction on the outgoing surface of the prism is turned. For example, when the scanning direction on the incident surface is linear in one direction, the outgoing surface provides a scanning beam that changes radially when the reflection surface is turned in synchronism with a scanning frequency.

As mentioned above, the invention employs a simple scanning optical system and a simple scan controlling portion to change the scanning direction of a light beam into an optional direction, so that the invention can scan a pattern formed in optional directions on a two-dimensional plane. In addition, the invention employs an acousto-optic deflection element to improve a scanning speed in any direction to measure a two-dimensional pattern at high speed.

The present invention combines two kinds of scanning elements having different scan angles and scan step resolutions to form a hybrid arrangement which can freely switch between wide range scanning and narrow range scanning by use of an optical system disposed in the same optical path and by only switching electric signals. The wide range scanning coarsely measures the shape of an object and determines the position of a part which is to be measured precisely. The narrow range scanning precisely scans the part and measures the shape and size of the part.

The invention can freely change the scanning direction of a beam so that an object may be scanned with the beam in optical axial directions not only in the directions of orthogonal axes X and Y. The invention can, therefore, measure, with a simple apparatus, the shape and size of an object that is formed in optical axial directions.

I claim:
1. A light beam scanner comprising:
   a light beam generating means for generating a light beam;
   a first scanning means for guiding the light beam in a first scanning direction;
   a second scanning means composed of a deflection prism for guiding the light beam in a second scanning direction that is different from the first scanning direction, said deflection prism having an incident surface, an outgoing surface, and a light reflection surface provided between said incident surface and said outgoing surface; and an object lens means, all of these means having a common optical axis.

2. A light beam scanner as set forth in claim 1, wherein the second scanning means is movable in an optical direction in parallel with the optical axis.

3. A light beam scanner as set forth in claim 1, wherein the second scanning means is turnable around the optical axis.

4. A light beam scanner as set forth in claim 1, wherein the second scanning means is movable in an optical direction in parallel with the optical axis and turnable around the optical axis.

5. A light beam scanner as set forth in claim 1, wherein the deflection prism of the second scanning means has an incident surface and an outgoing surface that are orthogonal to the optical axis, and at least three reflection points disposed between the incident and outgoing surfaces to reflect the light beam, the deflection prism being so constituted that the optical axis of a light beam entering the deflection prism is in parallel with the optical axis of a light beam exiting from the deflection prism.

6. A light beam scanner as set forth in claim 1, wherein the deflection prism is so constituted that the position or the scanning direction of a light beam exiting from the deflection prism differs by at least two times the position or the scanning direction of a light beam entering the deflection prism.

7. A light beam scanner as set forth in claim 5 or 6, wherein the second scanning means comprises an equilateral triangle prism and a rectangular prism having an apex angle of 30 degrees, the equilateral triangle prism being placed on a surface opposing an apex angle of 90 degrees of the rectangular prism, a surface opposing an apex angle of 60 degrees of the rectangular prism being the reflection surface, a surface opposing the apex angle of 30 degrees being the outgoing surface, a surface of the equilateral triangle prism which is in parallel with the outgoing surface being the incident surface orthogonal to the optical axis.

8. A light beam scanner as set forth in claim 1, wherein the first scanning means comprises a first scanning element and a second scanning element having at least different scanning ranges or different scanning resolutions.

9. A light beam scanner as set forth in claim 1 further comprising a third scanning means for guiding the light beam in the same scanning direction as in the second scanning means and having a light beam scanning range that differs from that of the second scanning means.

10. A light beam scanner as set forth in claim 1 which is useful as a bar code scanner, wherein a scanning direction of the light beam over a bar code can be rotated by at least said second scanning means.

11. A deflection prism employed by a light beam scanner, comprising an incident surface and an outgoing surface that are orthogonal to the optical axis of a light beam, and at least three reflection points disposed between the incident and outgoing surfaces to reflect the light beam, and constituted such that the optical axis of a light beam entering the deflection prism is in parallel with the optical axis of a light beam exiting the deflection prism, said deflection prism further comprising an equilateral triangle prism and a rectangular prism having an apex angle of 30 degrees associated with said equilateral triangle prism.

12. A light beam scanner comprising:
a first scanning means for guiding a light beam in a first axial direction on a plane that is orthogonal to a common optical axis;
a second scanning means composed of a deflection prism for guiding the light beam in a second axial direction, the deflection prism having an incident surface, an outgoing surface, and a reflection surface formed between the incident and outgoing surfaces, the first and second scanning means forming a scanning optical system;
a first scan controlling portion for controlling a scanning operation of the first scanning means;
a moving means for moving the second scanning means in the second axial direction; and
a controlling means for controlling movements of the second scanning means,
all of means belonging to an optical system including at least said first and second scanning means having the common optical axis and being arranged in an optical path extending between a laser source and an object lens,
the moving means moving the second scanning means to shift the light beam which is guided in the first axial direction and enters the incident surface of the second scanning means, in the second axial direction, thereby two-dimensionally scanning an object with the light beam.

13. A light beam scanner comprising:
a first scanning means for guiding a light beam in a first axial direction on a plane that is orthogonal to a common optical axis;
a second scanning means composed of a deflection prism for guiding the light beam in a second axial direction, the deflection prism having an incident surface, between the incident and outgoing surfaces, the first and second scanning means forming a scanning optical system;
a first scan controlling portion for controlling a scanning operation of the first scanning means;
a turning means for turning the second scanning means around the common optical axis; and
a controlling means for controlling the turn of the second scanning means,
all of means belonging to an optical system including at least said first and second scanning means having the common optical axis and being arranged in an optical path extending between a laser source and an object lens,
the turning means turning the second scanning means to change the light beam which is guided in the first axial direction and enters the incident surface of the second scanning means, in an optional scanning direction, thereby two-dimensionally scanning an object with the light beam.

14. A light beam scanner comprising:
a first scanning means for guiding a light beam in a first axial direction on a plane X-Y that is orthogonal to a common optical axis;
a second scanning means composed of a deflection prism for guiding the light beam in a second axial direction, the deflection prism having an incident surface, an outgoing surface, and a reflection surface disposed between the incident and outgoing surfaces, the first and second scanning means forming a scanning optical system;
a first controlling means for controlling the first scanning means;

a moving means for moving the second scanning means in the second axial direction to move the reflection surface in the second axial direction;

a turn controlling means for turning the second scanning means around a center axis, all of means belonging to an optical system including at least said first and second scanning means having the common optical axis and being disposed in an optical path extending between a laser source and an object lens, the turn controlling means turning the reflection surface of the second scanning means, the light beam guided in the first axial direction being made incident to the incident surface of the second scanning means, and at the same time the moving means moving the reflection surface in the second axial direction, thereby two-dimensionally scanning an object with the light beam.

15. A light beam scanner as set forth in claim 14 further comprising a third scanning means for guiding the light beam in the second axial direction, wherein the turn controlling means sets a turn angle of the reflection surface of the second scanning means, the third scanning means shifts the light beam which is guided in the first axial direction by the first scanning means, in the second axial direction to make the light beam enter the incident surface of the second scanning means, and at the same time, the moving means changes the reflection surface of the second scanning means in the second axial direction, thereby two-dimensionally scanning the object.

16. A light beam scanner comprising:

a first scanning means composed of first and second scanning elements having different scanning ranges and scan resolutions;

a second scanning means made of a deflection prism having an incident surface, an outgoing surface, and a reflection surface formed between the incident and outgoing surfaces;

a scan controlling means for driving the first and second scanning elements; and a turn/shift controlling means for turning the second scanning means or shifting the second scanning means in parallel with a common optical axis, all of means belonging to an optical system including at least said first and second scanning means having the common optical axis and being arranged in an optical path extending between a laser source and an object lens, the scan controlling means controlling the first scanning element to scan a first region on the incident surface of the second scanning means, and controlling the second scanning element to scan a second region which is a part of the first region on the incident surface of the second scanning means, the turn/shift controlling means turning the reflection surface of the second scanning means in a plane that is vertical to the common optical axis, or shifting the reflection surface, thereby changing the scanning direction of the light beam that has passed through the first and second scanning elements and entered the incident surface of the second scanning means, and letting the light beam exit from the outgoing surface of the second scanning means.

17. A light beam scanner as set forth in claim 16, wherein the first scanning element comprises a first scanning portion for guiding the optical beam in a first scanning direction and a second scanning portion for guiding the light beam in a second scanning direction which is different from the first scanning direction.

18. A light beam scanner as set forth in claim 16, wherein a scanning range of the first scanning means is larger than that of the second scanning means.

* * * * *

UNITED STATES PATENT AND TRADEMARK OFFICE
CERTIFICATE OF CORRECTION

PATENT NO. : 5,166,820

DATED : November 24, 1992

INVENTOR(S) : Hiroo Fujita

It is certified that error appears in the above-identified patent and that said Letters Patent is hereby corrected as shown below:

Claim 13, column 20, line 36, after "surface", insert

--an ongoing surface, and a reflection surface formed--.

Signed and Sealed this

Fourteenth Day of December, 1993

Attest:

BRUCE LEHMAN

Attesting Officer

Commissioner of Patents and Trademarks